(12) United States Patent
Hall et al.

(10) Patent No.: US 10,823,099 B1
(45) Date of Patent: Nov. 3, 2020

(54) ENGINE MONITORING SYSTEM (71) Applicant: Caterpillar Inc., Peoria, IL (US)

(72) Inventors: James Hall, Peoria, IL (US); Ahmed Syed, Oak Brook, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/579,241

(22) Filed: Sep. 23, 2019

(51) Int. Cl.
*F02D 41/22* (2006.01)
*H02N 2/18* (2006.01)
*F02D 31/00* (2006.01)
*G07C 5/08* (2006.01)

(52) U.S. Cl.
CPC .............. *F02D 41/22* (2013.01); *G07C 5/08* (2013.01); *H02N 2/186* (2013.01); *F02D 31/001* (2013.01)

(58) Field of Classification Search
CPC .................................. F02D 41/22; G07C 5/08
See application file for complete search history.

(56) References Cited

U.S. PATENT DOCUMENTS

| | | | |
|---|---|---|---|
| 6,675,639 B1 * | 1/2004 | Schricker | G01M 15/102 73/114.01 |
| 7,170,201 B2 | 1/2007 | Hamel et al. | |
| 8,618,934 B2 | 12/2013 | Belov et al. | |
| 9,407,112 B2 | 8/2016 | Tatar et al. | |
| 9,701,325 B2 | 7/2017 | Kim et al. | |
| 2006/0086089 A1 * | 4/2006 | Ge | F02B 37/22 60/599 |
| 2015/0000643 A1 * | 1/2015 | Green | F02M 21/0215 123/526 |
| 2017/0199229 A1 | 7/2017 | King et al. | |
| 2017/0292250 A1 * | 10/2017 | Sato | E02F 9/2066 |
| 2018/0087460 A1 * | 3/2018 | Pathan | F02D 41/1498 |

* cited by examiner

*Primary Examiner* — Kevin A Lathers
(74) *Attorney, Agent, or Firm* — Harrity & Harrity LLP (57) ABSTRACT

A controller associated with an engine monitoring system may determine a voltage value concerning at least one supercapacitor associated with the engine monitoring system. The controller may selectively cause, based on determining whether the voltage value satisfies a voltage value threshold, the at least one supercapacitor, or a battery associated with the engine monitoring system, to provide electrical power to a sensor system associated with the engine monitoring system. The controller may obtain, from the sensor system, vibration information relating to an engine associated with the engine monitoring system and pressure information relating to a crankcase of the engine. The controller may determine, based on the vibration information and the pressure information, engine speed information related to the engine and may send the engine speed information to a monitoring device.

20 Claims, 7 Drawing Sheets

ENGINE MONITORING SYSTEM

TECHNICAL FIELD

The present disclosure relates generally to an engine monitoring system and, more particularly to an engine monitoring system that can be included in an engine oil cap.

BACKGROUND

A wireless sensor may collect information related to operation of an engine of a machine and transmit the information to another device. In many cases, the wireless sensor may be powered by a battery, which occasionally needs to be recharged or replaced. Often, however, the battery dies and is not able of being immediately recharged or replaced, rendering the wireless sensor inoperable.

One attempt to provide a scheme for powering a wireless sensor system with a source of energy that avoids the need to provide, replace or recharge batteries is disclosed in U.S. Pat. No. 7,170,201 issued to Hamel et al. on Jan. 30, 2007 ("the '201 patent"). In particular, the '201 patent discloses using electro-magnetic devices (coil with permanent magnet), Weigand effect devices, and piezoelectric (PZT) transducer materials to harvest vibrational energy that would be available on diesel turbine engine components, propeller shaft drive elements, and other machinery and equipment. Accordingly, per the '201 patent, an electrical output (e.g., of a PZT) charges a storage capacitor and provides power to a wireless sensing module for transmitting sensor data through an antenna.

While the scheme of the '201 patent may be effective to harvest vibrational energy to provide power to a wireless sensing module, the scheme is not able to provide power to the wireless sensor when the storage capacitor is not sufficiently charged. The '201 patent does not disclose other ways to provide power to the wireless sensor to ensure that that the wireless sensor can continually operate. Accordingly, the system of the present disclosure solves one or more of the problems set forth above and/or other problems in the art.

SUMMARY

According to some implementations, a method may include determining, by a controller associated with an engine monitoring system, a voltage value concerning at least one supercapacitor associated with the engine monitoring system; determining, by the controller, whether the voltage value satisfies a voltage value threshold; selectively causing, by the controller and based on determining whether the voltage value satisfies the voltage value threshold, the at least one supercapacitor, or a battery associated with the engine monitoring system, to provide electrical power to a sensor system associated with the engine monitoring system; obtaining, by the controller and from the sensor system, vibration information relating to an engine associated with the engine monitoring system and pressure information relating to a crankcase of the engine; determining, by the controller and based on the vibration information and the pressure information, engine speed information related to the engine; and sending, by the controller, the engine speed information to a monitoring device.

According to some implementations, a hydraulic power system may comprise a transmitting device; a battery configured to provide electrical power to the transmitting device, a sensor system, and a controller; an energy harvester configured to provide electrical power to at least one supercapacitor; the at least one supercapacitor configured to provide electrical power to the transmitting device, the sensor system, and the controller; a sensor system; and a controller configured to: selectively cause the at least one supercapacitor or the battery to provide electrical power to the transmitting device, the sensor system, and the controller; obtain, from the sensor system, vibration information relating to an engine associated with the engine monitoring system; obtain, from the sensor system, pressure information relating to a crankcase of the engine; determine, based on the vibration information or the pressure information, engine speed information related to the engine; and send, via the transmitting device, the engine speed information to a monitoring device.

According to some implementations, a monitoring device may include one or more memories; and one or more processors, communicatively coupled to the one or more memories, configured to: obtain engine speed information from an engine monitoring system; process the engine speed information to determine an engine maintenance status of an engine associated with the engine monitoring system; and perform, based on the engine maintenance status, one or more actions.

DETAILED DESCRIPTION

Figure 1:
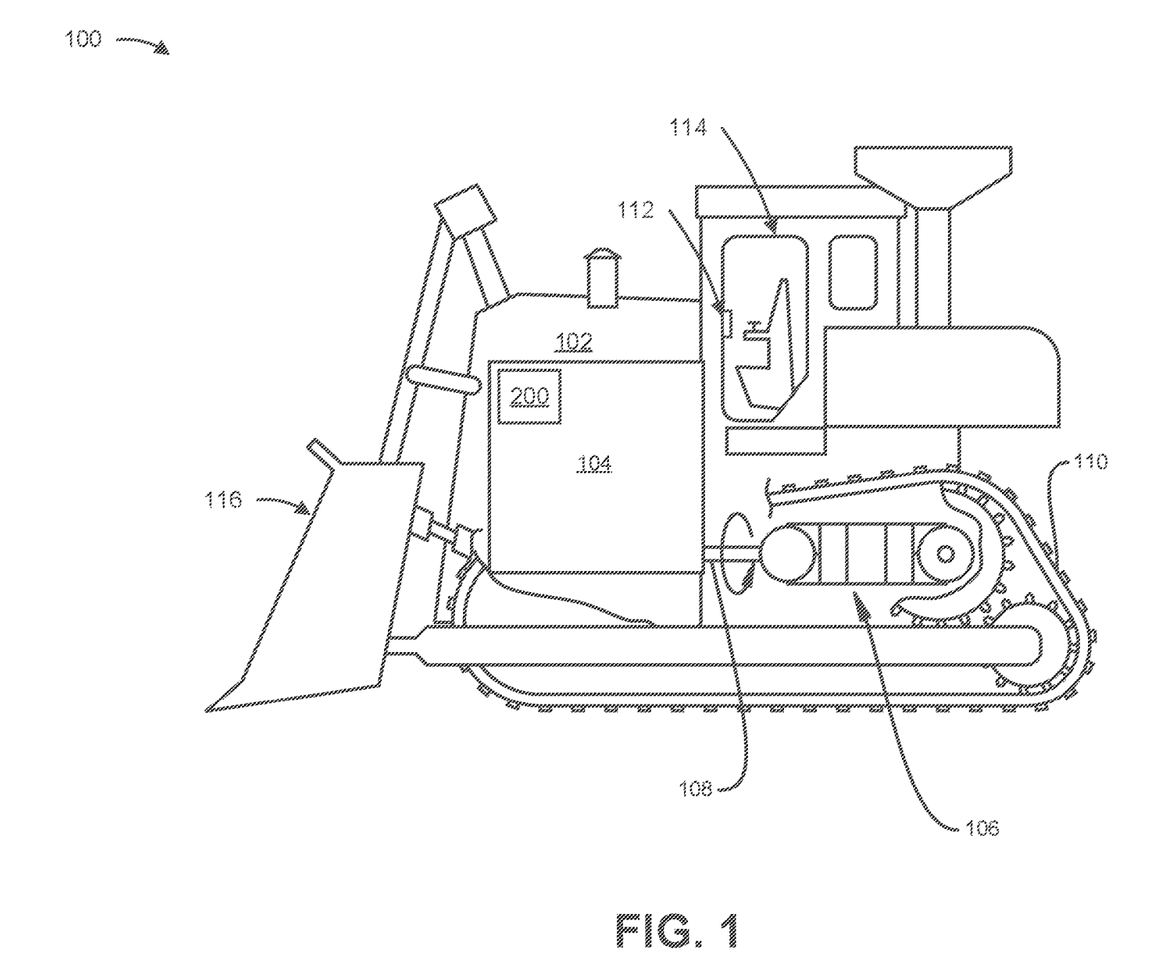
FIG. 1 is a diagram of an example machine described herein.

FIG. 1 is a diagram of an example machine 100 described herein. The term "machine" may refer to any machine that performs an operation associated with an industry such as, for example, mining, construction, farming, transportation, or any other industry. For example, the machine 100 may include a mobile machine, such as a track type tractor shown in FIG. 1, or any other type of mobile machine. As another example, the machine 100 may include a stationary machine, such as a genset or a generator, or any other type of stationary machine.

As shown, the machine 100 may have a frame 102 that supports an engine 104, a drive system 106, a drive shaft 108, and a traction system 110. The engine 104 is configured to supply power to the machine 100. The engine 104 may be an internal combustion engine (for example, a compression ignition engine), but in general, the engine 104 may be any prime mover that provides power to various systems of the machine 100. The engine 104 may be fueled by such fuels as distillate diesel fuel, biodiesel, dimethyl ether, gaseous fuels (such as hydrogen, natural gas, and propane), alcohol, ethanol, and/or any combination thereof. The engine 104 may be operably arranged to receive control signals from operator controls 112 in operator station 114. Additionally, the engine 104 may be operably arranged with the drive system 106 and/or an implement 116 to selectively operate the drive system 106 and/or the implement 116 according to control signals received from the operator controls 112. The engine 104 may provide operating power for the propulsion of the drive system 106 and/or the operation of the implement 116 via, for example, the drive system 106, the drive shaft 108, and/or the like. An engine monitoring system 200 may obtain information relating to the engine 104, as described herein.

The drive system 106 may be operably arranged with the engine 104 to selectively propel the machine 100 via control signals from the operator controls 112. The drive system 106 may be operably connected to a plurality of ground-engaging members, such as traction system 110, as shown, which may be movably connected to the machine 100 and the frame 102 through axles, drive shafts, a transmission, and/or other components and which may be movably connected to the engine 104 and drive system 106 via the drive shaft 108. The traction system 110 may be provided in the form of a track-drive system, a wheel-drive system, or any other type of drive system configured to propel the machine 100. The drive system 106 may be operably arranged with the engine 104 to selectively operate the implement 116, which may be movably connected to the machine 100, the frame 102, and the drive system 106.

As indicated above, FIG. 1 is provided as an example. Other examples are possible and may differ from what was described in connection with FIG. 1.

Figure 2:
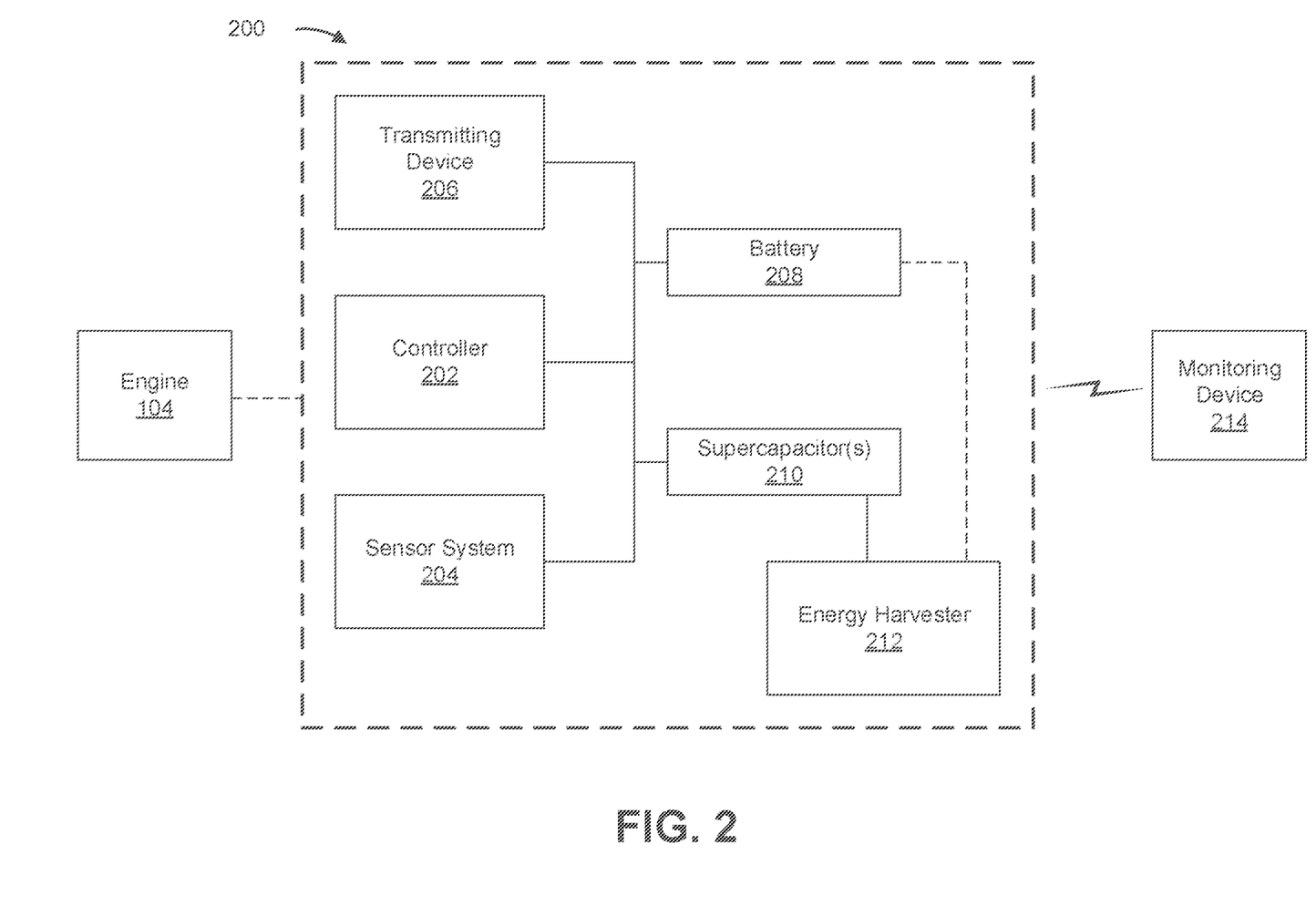
FIG. 2 is a diagram of an example engine monitoring system described herein.

FIG. 2 is a diagram of an example engine monitoring system 200 described herein. The engine monitoring system 200 may include a controller 202, a sensor system 204, a transmitting device 206, a battery 208, at least one supercapacitor 210, and/or an energy harvester 212. The engine monitoring system may be associated with the engine 104 (e.g., the engine monitoring system 200 may monitor the engine 104). The engine monitoring system may be positioned on or near the engine 104, such as in an oil cap of the engine 104, as described herein. The engine monitoring system 200 may communicate (e.g., via transmitting device 206) with the monitoring device 214.

The controller 202, as described herein, provides control of the engine monitoring system 200 and/or components of the engine monitoring system 200. The controller 202 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. The processor may be implemented in hardware, firmware, and/or a combination of hardware and software. The controller 202 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the controller 202. The controller 202 may include a memory (e.g., a non-transitory computer-readable medium) capable of storing instructions that, when executed, cause the processor to perform one or more processes and/or methods described herein. In some implementations, the controller may be incorporated into a printed circuit board (PCB).

The controller 202 may be electronically connected to the battery 208 and/or the at least one supercapacitor 210 and may be configured to control the battery 208 and/or the at least one supercapacitor 210. The battery 208 may be configured to provide electrical power to the controller 202, the sensor system 204, and/or the transmitting device 206. Similarly, the at least one supercapacitor 210 may be configured to provide electrical power to the controller 202, the sensor system 204, and/or the transmitting device 206. The at least one supercapacitor 210 may be electronically connected to the energy harvester 212, and the at least one supercapacitor 210 may be further configured to store electrical power provided by the energy harvester 212.

The energy harvester 212 may be configured to convert mechanical vibrations associated with operation of the engine 104 into electrical power (e.g., when the engine monitoring system 200 is placed on or near the engine 104, such as in an oil fill cap, as described herein, the energy harvester 212 may sense mechanical vibrations of the engine 104 and convert the mechanical vibrations into electrical power). In some implementations, the energy harvester 212 may be an electrostatic energy harvester device, a magnetic induction energy harvester device, a piezoelectric energy harvester device, and/or the like. The energy harvester 212 may be configured to convert mechanical vibrations that have frequencies in a range of, for example, 30 Hz to 100 Hz (e.g., greater than or equal to 30 Hz and less than or equal to 100 Hz) into electrical power (e.g., one or more components of the energy harvester 212 may be tuned to resonate with mechanical vibrations in the range of 30 Hz to 100 Hz to enable conversion of the mechanical vibrations into electrical power). In some implementations, the energy harvester 212 may be configured to convert mechanical vibrations that have frequencies in a range of 0 Hz to 500 Hz. The energy harvester 212 may be configured to provide the electrical power to the at least one supercapacitor 210.

The controller 202 may control when electrical power is supplied by the battery 208 or the at least one supercapacitor 210 to the controller 202, the sensor system 204, and/or the transmitting device 206. For example, the controller 202 may determine and/or obtain a voltage value concerning the at least one supercapacitor 210 (e.g., which may indicate a state of charge of the at least one supercapacitor 210). The controller 202 may determine whether the voltage value satisfies (e.g., is greater than or equal to) a voltage value threshold (e.g., a minimum voltage required to provide sufficient electrical power to operate the controller 202, the sensor system 204, and/or the transmitting device 206). Based on determining that the voltage value satisfies the threshold, the controller 202 may cause the at least one supercapacitor 210 to provide the electrical power to the controller 202, the sensor system 204, and/or the transmitting device 206. Additionally, or alternatively, based on determining that the voltage value fails to satisfy the threshold, the controller 202 may cause the battery 208 to provide the electrical power to the controller 202, the sensor system 204, and/or the transmitting device 206. In this way, the controller 202 ensures that electrical power is always available to the controller 202, the sensor system 204, and/or the transmitting device 206, even when the at least one supercapacitor 110 has an insufficient charge. Moreover, the controller 202 ensures that the battery 208 is not always used to provide the electrical power to the controller 202, the sensor system 204, and/or the transmitting device 206, which may extend the life of the battery 208.

As shown in FIG. 2, the controller 202 may be electronically connected with the sensor system 204 and/or the transmitting device 206. The sensor system 204 may provide measurements associated with various parameters used by the controller 202 to control the engine monitoring system 200 and/or components of the engine monitoring system 200. The sensor system 204 may include physical sensors and/or any appropriate type of control system that generates values of sensing parameters based on a computational model and/or one or more measured parameters. As used herein, sensing parameters may refer to those measurement parameters that are directly measured and/or estimated by one or more sensors (e.g., physical sensors, virtual sensors, and/or the like). Example sensors may include temperature sensors (e.g., to measure a temperature of the engine 104, a temperature of oil used by the engine 104, a temperature of a crankcase of the engine 104, and/or the like), vibration sensors (e.g., to measure vibrations (e.g., in hertz (Hz)) of the engine 104 and/or vibrations of one or more components of the engine 104), pressure sensors (e.g., to measure a pressure of gases (e.g., in kilopascals (kPa)) in engine 104, in the crankcase of engine 104, and/or the like), location sensors (e.g., to measure a location (e.g., a latitude and/or longitude) of the engine 104), and/or the like. Sensing parameters may also include any output parameters that may be measured indirectly by physical sensors and/or calculated based on readings of physical sensors.

The sensor system 204 may be configured to coincide with the controller 202, may be configured as a separate control system, and/or may be configured as a part of other control systems. Further, the controller 202 may implement the sensor system 204 by using computer software, hardware, or a combination of software and hardware.

The controller 202 may be configured to obtain data from the sensor system 204 to determine information. For example, the controller 202 may obtain vibration data relating to the engine 104 from the sensor system 204 (e.g., a vibration sensor, such as an accelerometer device, of the sensor system 204) at discrete moments in time (e.g., every second, every 15 seconds, every minute, and/or the like). The controller 202 may determine vibration information relating to the engine 104 by combining the vibration data obtained from the sensor system 204 during a period of time (e.g., 30 seconds, 1 minute, 45 minutes, 2 hours, and/or the like). The vibration information may indicate a respective vibration frequency of the engine 104 at each discrete moment in time. Additionally, or alternatively, the vibration information may indicate a respective number of times the engine 104 vibrated at a frequency within one or more frequency ranges during the period of time (e.g., the vibration information may include a histogram regarding vibration frequencies of the engine 104, a fast Fourier transform (FFT) regarding vibration frequencies of the engine 104, and/or the like).

As another example, the controller 202 may obtain pressure data relating to the engine 104 and/or a crankcase of the engine 104 from the sensor system 204 (e.g., a pressure sensor device of the sensor system 204) at discrete moments in time (e.g., every second, every 15 seconds, every minute, and/or the like). The controller 202 may determine pressure information related to the engine 104 and/or the crankcase of the engine 104 by combining the pressure data obtained from the sensor system 204 during a period of time (e.g., 30 seconds, 1 minute, 45 minutes, 2 hours, and/or the like). The pressure information may indicate a respective pressure relating to the engine 104 and/or the crankcase of the engine 104 (e.g., a pressure of one or more gases (e.g., exhaust gas, oil vapor, fuel vapor, and/or the like) present in the engine 104 and/or the crankcase of the engine 104) at each discrete moment in time. Additionally, or alternatively, the pressure information may indicate a respective number of times gases associated with the engine 104 and/or the crankcase of engine 104 exert a pressure within one or more pressure ranges during the period of time (e.g., the pressure information may include a histogram regarding pressure of the gases associated with the engine 104 and/or the crankcase of engine 104).

In an additional example, the controller 202 may obtain temperature data relating to the engine 104 from the sensor system 204 (e.g., a temperature sensor device of the sensor system 204) at discrete moments in time. The controller 202 may determine temperature information by combining the temperature data obtained from the sensor system 204 during a period of time. The temperature information may indicate a respective temperature associated with the engine 104 (e.g., a temperature of the engine 104, a temperature of oil in the engine 104, and/or the like) at each discrete moment in time. Additionally, or alternatively, the temperature information may indicate a respective number of times a temperature associated with the engine 104, the oil of the engine 104, and/or the like falls within one or more temperature ranges during the period of time (e.g., the temperature information may include a histogram regarding the temperature associated with the engine 104).

In a further example, the controller 202 may obtain location data relating to the engine 104 from the sensor system 204 (e.g., a location sensor device, such as a global positioning system (GPS) device, of the sensor system 204) at discrete moments in time. The controller 202 may determine location information by combining the location data obtained from the sensor system 204 during a period of time. The temperature information may indicate one or more locations of the engine 104 during the period of time.

In some implementations, the controller 202 may determine engine speed information related to the engine 104. The engine speed information may indicate one or more engine speed ranges of the engine 104 and how long the engine 104 operated within each engine speed range of the one or more engine speed ranges. Additionally, or alternatively, the engine speed information may indicate a respective number of times the engine 104 operated at a speed within each engine speed range, of the one or more engine speed ranges, during a period of time (e.g., the speed information may include a histogram regarding the speed of the engine 104).

The controller 202 may process the vibration information and/or the pressure information to determine the engine speed information related to the engine 104. For example, the controller 202 may identify one or more frequency ranges indicated by the vibration information and may determine one or more engine speed ranges respectively associated with the one or more frequency ranges (e.g., the controller may use a lookup table or an algorithm to identify a correspondence between a particular frequency range and a particular engine speed range, such as a correspondence between a range of 25-35 Hz and a range of 750-1,050 revolutions per minute (RPM) (e.g., when the engine 104 is a four cylinder, four stroke engine)). Accordingly, based on the vibration information, the controller 202 may determine a respective number of times the engine operates at a speed within each engine speed range of the one or more engine speed ranges during the period of time. In a similar example, the controller 202 may identify one or more pressure ranges indicated by the pressure information and may determine one or more engine speed ranges respectively associated with the one or more pressure ranges (e.g., the controller may use a lookup table or an algorithm to identify a correspondence between a particular pressure range and a particular engine speed range, such as a correspondence between a range of 300-320 kPA and a range of 3,600-3,800 RPMs). Accordingly, based on the pressure information, the controller 202 may determine a respective number of times the engine operates at a speed within each engine speed range of the one or more engine speed ranges during the period of time.

As another example, the controller 202 may process the vibration information to determine first engine speed information that indicates one or more engine speed ranges and a respective first number of times the engine 104 operated at a speed within each engine speed range, of the one or more engine speed ranges, during a period of time (e.g., 1 minute, 3 minutes, 10, minutes, 30 minutes, and/or the like). The controller 202 may process the pressure information to determine second engine speed information that indicates a respective second number of times the engine 104 operated at a speed within each engine speed range, of the one or more engine speed ranges, during the period of time. The controller 202 may generate the engine speed information by combining the first engine speed information and the second engine speed information. For example, for each engine speed range of the one or more engine speed ranges, the controller 202 may combine (e.g., using an average, a weighted average, and/or the like) the respective first number of times the engine 104 operated at a speed within the engine speed range and the respective second number of times the engine 104 operated at a speed with the engine speed range.

The controller 202 may determine engine hour information related to the engine 104. The engine hour information may indicate a number of hours the engine 104 has operated during a period of time (e.g., a day, a week, a month, and/or the like). The controller 202 may process the vibration information and/or the pressure information to determine the engine hour information related to the engine 104. For example, the controller 202 may determine, based on the vibration information, a number of hours the engine 104 vibrated during the period of time and may therefore determine the number of hours the engine 104 has operated. In another example, the controller 202 may determine, based on the pressure information, a number of hours the engine 104 experienced pressure and may therefore determine the number of hours the engine 104 has operated.

The controller 202 may be electronically connected with the transmitting device 206 and may be configured to control the transmitting device 206. The transmitting device may include one or more components, such as an antenna, for wirelessly communicating with the monitoring device 214. The transmitting device may be able to wirelessly communicate with the monitoring device 214 using a short-range wireless communication connection (e.g., a Bluetooth connection, a Wi-Fi connection, and/or the like) and/or a long-range wireless communication connection (e.g., a cellular connection, such as a 4G cellular connection, an LTE cellular connection, a 5G cellular connection, and/or the like).

The controller 202 may cause the transmitting device 206 to send the vibration information, the pressure information, the temperature information, the location information, the engine hour information, and/or the engine speed information to the monitoring device 214. For example, controller 202 may cause the transmitting device 206 to initiate a wireless connection (e.g., a cellular connection with) a base station (e.g., associated with providing the cellular connection) and may cause the transmitting device 206 to send the engine hour information and/or the engine speed information to the monitoring device 214 via the wireless connection (e.g., send the engine hour information and/or the engine speed information to the base station to allow the base station to send the engine hour information and/or the engine speed information to the monitoring device 214).

The controller 202 may cause the transmitting device 206 to send the vibration information, the pressure information, the temperature information, the location information, the engine hour information and/or the engine speed information to the monitoring device 214 on a scheduled basis, on a triggered basis, a periodic basis, and/or the like. For example, the controller 202 may process the vibration information to identify a trigger event related to operation of the engine 104 (e.g., when the engine 104 turns on, when the engine 104 turns off, when a vibrational frequency of the engine 104 satisfies (e.g., is greater than or equal to) a vibration frequency threshold, when the vibrational frequency of the engine 104 fails to satisfy (e.g., is less than) the vibration frequency threshold, and/or the like). Accordingly, the controller 202 may cause, based on identifying the trigger event, the transmitting device 206 to send the vibration information, the pressure information, the temperature information, the location information, the engine hour information and/or the engine speed information to the monitoring device 214.

The monitoring device 214 may be a communication and/or computing device, such as a mobile phone (e.g., a smart phone, a radiotelephone, and/or the like), a laptop or desktop computer, a server device, a cloud device, a data center device, or a similar type of device. The monitoring device 214 may include a processor, such as a CPU, a GPU, an APU, a microprocessor, a microcontroller, a DSP, an FPGA, an ASIC, and/or another type of processing component. The processor may be implemented in hardware, firmware, and/or a combination of hardware and software. The monitoring device 214 may include one or more processors capable of being programmed to perform a function. One or more memories, including a RAM, a ROM, and/or another type of dynamic or static storage device (e.g., a flash memory, a magnetic memory, and/or an optical memory) may store information and/or instructions for use by the monitoring device 214. The monitoring device 214 may include a memory (e.g., a non-transitory computer-readable medium) capable of storing instructions that, when executed, cause the processor to perform one or more processes and/or methods described herein.

As described herein, the monitoring device 214 may receive the vibration information, the pressure information, the temperature information, the location information, the engine hour information and/or the engine speed information from the engine monitoring system 200 (e.g., via the transmitting device 206). Accordingly, the monitoring device 214 may perform one or more actions based on the vibration information, the pressure information, the temperature information, the location information, the engine hour information and/or the engine speed information. For example, the monitoring device 214 may store the vibration information, the pressure information, the temperature information, the location information, the engine hour information and/or the engine speed information in a data structure. In another example, the monitoring device may track a location and operation status of the engine 104 based on the vibration information, the pressure information, the temperature information, the location information, the engine hour information and/or the engine speed information.

As another example, the monitoring device may process the vibration information, the pressure information, the temperature information, the location information, the engine hour information and/or the engine speed information to determine an engine maintenance status of the engine 104. The engine maintenance status may indicate a number of operating hours of the engine 104, a number of hours the engine 104 operated at a speed that satisfies (e.g., is greater than or equal to) one or more thresholds, a representative operating temperature of the engine 104 and/or the oil of engine 104, a representative pressure of gases in the engine 104 and/or the crankcase of the engine 104, a representative vibrational frequency of the engine 104, a distance traveled by the engine 104, and/or the like.

In another example, the monitoring device 214 may process the engine maintenance status to determine and/or generate a maintenance schedule for the engine 104. The maintenance schedule may identify a service time indicating when the engine 104 is to be service, a service location indicating where the engine 104 is to be serviced, and/or the like.

In a further example, the monitoring device 214 may process the engine maintenance status to determine and/or generate one or more instructions on how to service the engine 104, when to service the engine 104, and/or the like. The monitoring device 214 may send the one or more one or more instructions to a client device (e.g., a mobile phone of an operator of machine 100) to allow the client device to display the one or more instructions on a display of the client device.

In an additional example, the monitoring device 214 may process the engine maintenance status to determine and/or generate one or more instructions that indicate a service time to service the engine 104, a service location to service the engine 104, and/or the like. The monitoring device 214 may send the one or more one or more instructions to a client device (e.g., a mobile phone of a service technician) to allow the client device to dispatch the service technician at the service time to the service location to service the engine 104.

Some implementations described herein provide that the controller 202 performs one or more processing steps, but implementations include the monitoring device 214 performing some or all of the processing steps. Similarly, some implementations described herein provide that the monitoring device 214 performs one or more processing steps, but additional implementations include the controller 202 performing some or all of the processing steps.

As indicated above, FIG. 2 is provided as an example. Other examples may differ from what is described in connection with FIG. 2.

Figure 3:
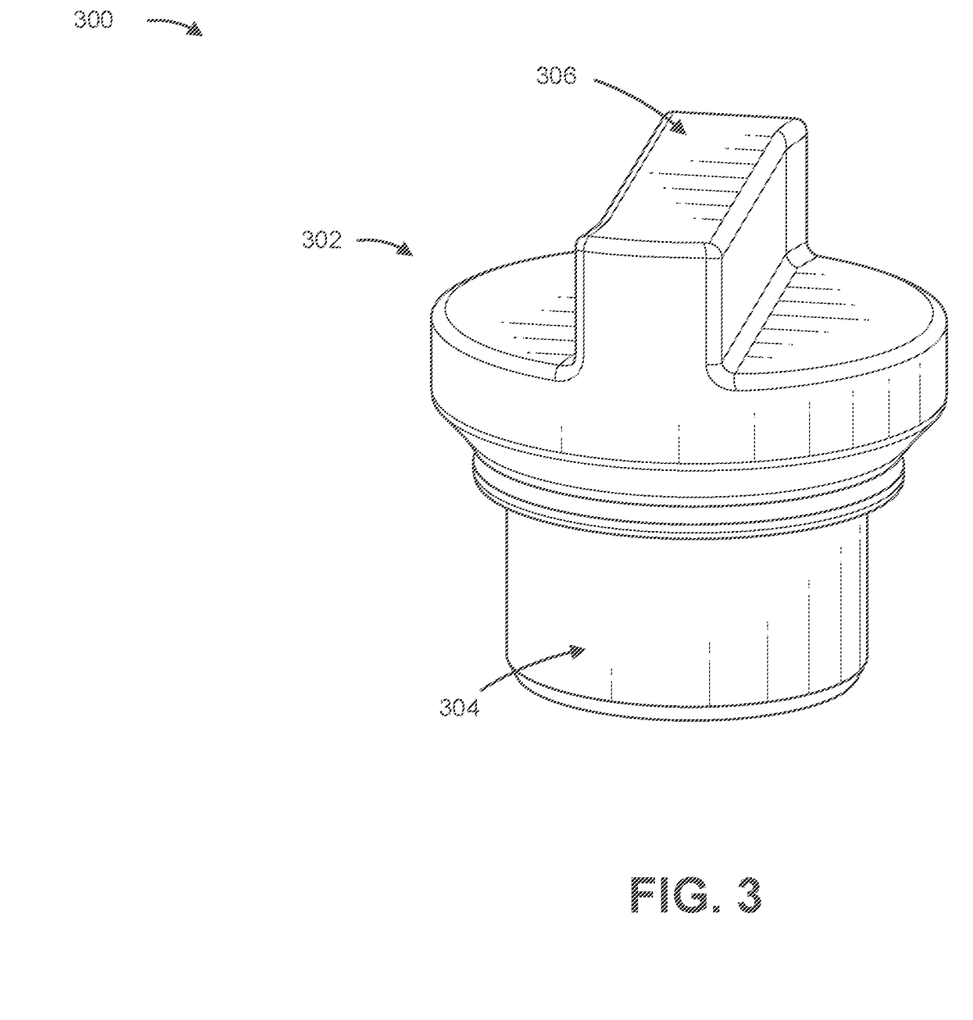
FIGS. 3-5 are diagrams of an example oil cap that includes an engine monitoring system.

FIG. 3 is a diagram 300 illustrating an isometric view of an example oil cap 302 that may include the engine monitoring system 200. The oil cap 302 may be an oil filler cap, an oil drain cap, and/or the like of engine 104. The oil cap 302 may include an insertion portion 304 to be inserted into the engine 104. The oil cap 302 may include a turn bar 306 that may be gripped by a hand of an operator to insert, remove, and/or secure the oil cap in the engine 104. The engine monitoring system 200 may be included with an internal portion of the oil cap 302 (e.g., the engine monitoring system may be enclosed by one or more parts of the oil cap 302), as described herein in relation to FIGS. 4 and 5. While some implementations described herein provide that the engine monitoring system 200 may be included in an oil cap, additional implementations provide that the engine monitoring system 200 may be included in any other type of cap or structure attached to the engine 104, such as a coolant cap, a washer fluid cap, a transmission fluid cap, a power generator, a power bank device, and/or the like.

Figure 4:
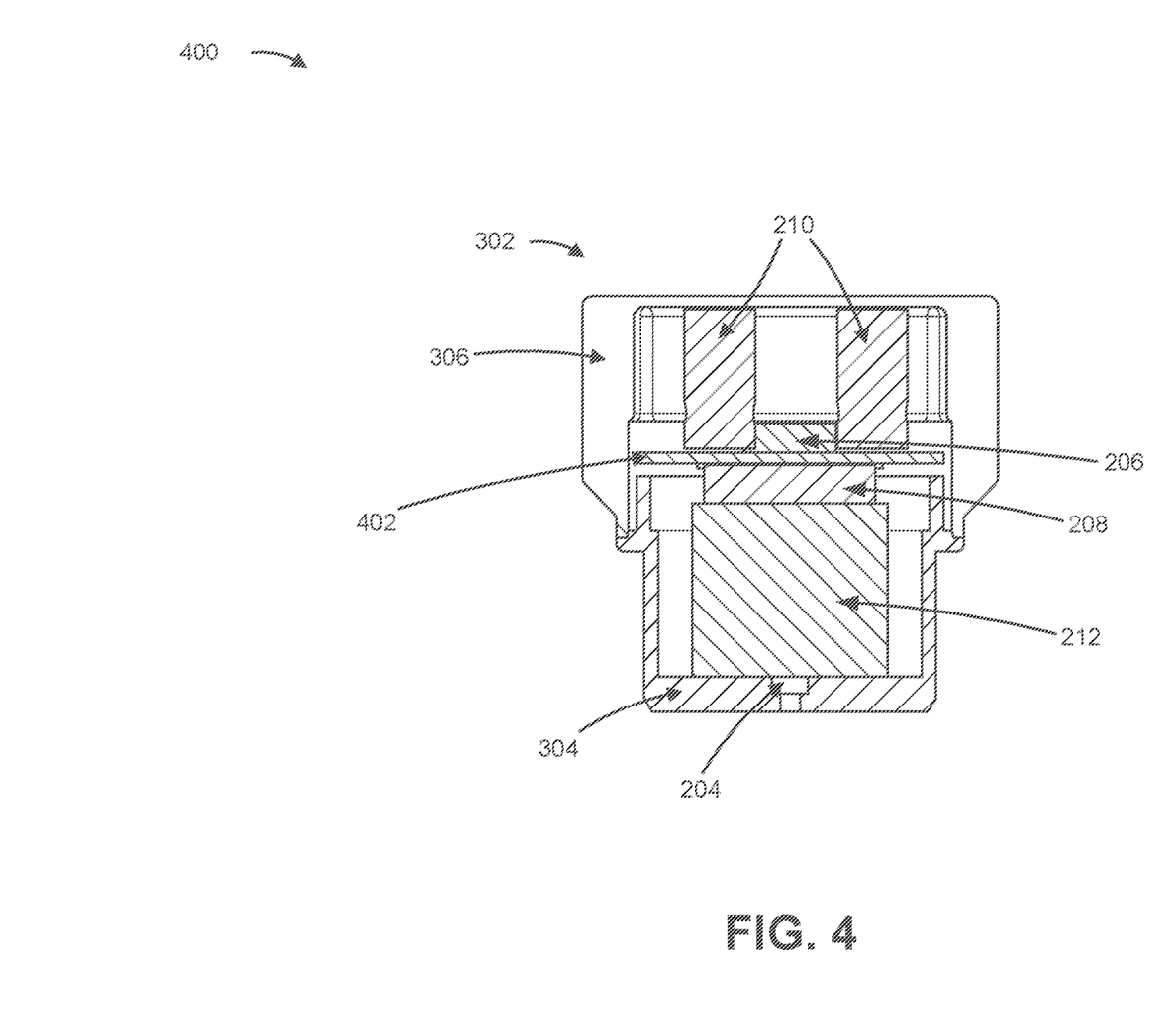
Figure 5:
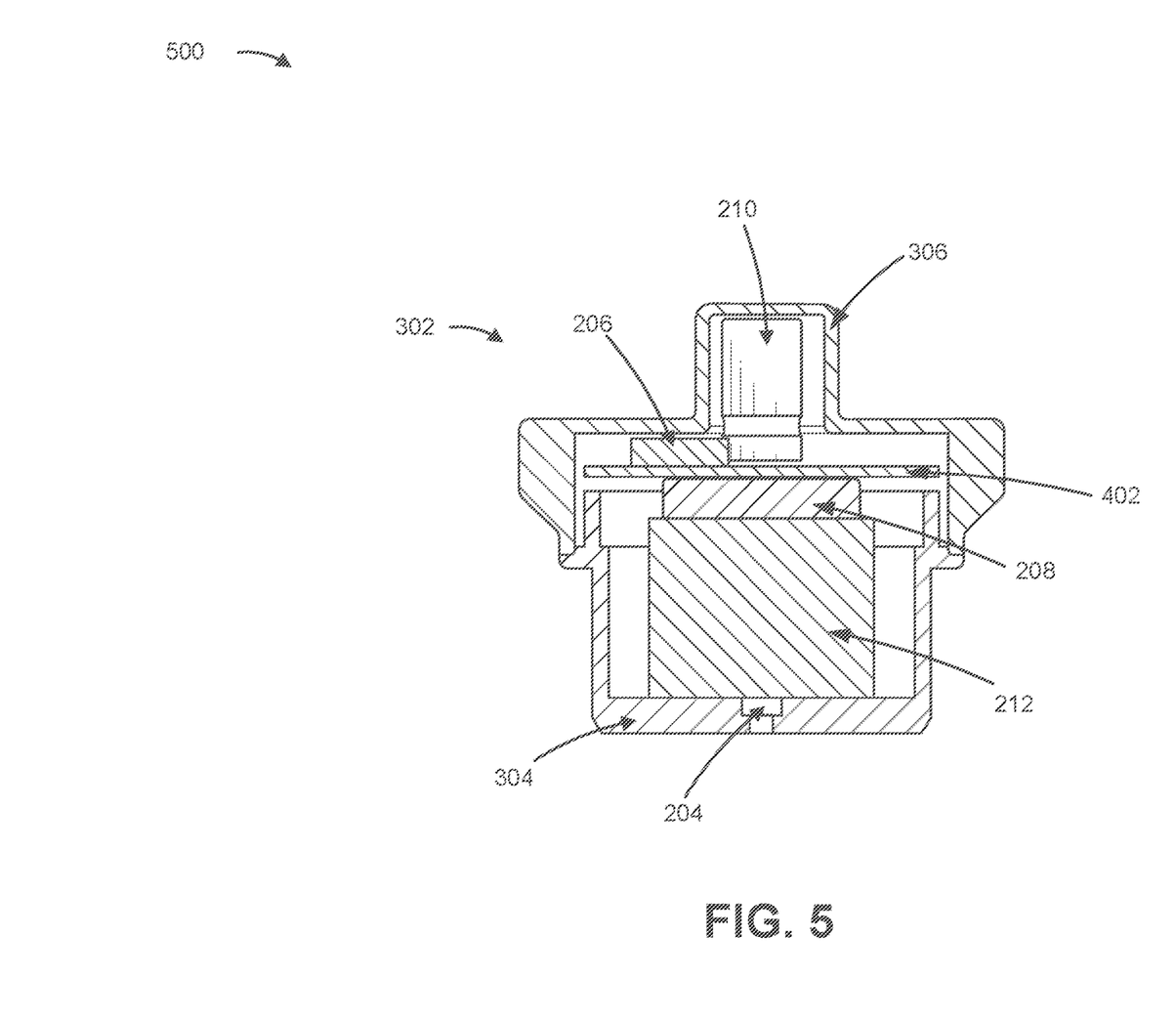

FIG. 4 is a diagram 400 illustrating a cutaway front view of the example oil cap 302. FIG. 5 is a diagram 500 illustrating a cutaway side view of the example oil cap 302.

As shown in FIGS. 4 and 5, the sensor system 204 may be included within the insertion portion 304 of the oil cap 302. In this way, the sensor system 204 may be as close as possible to an interior part of the engine 104 (e.g., when the oil cap 302 is inserted into the engine 104), which may facilitate the sensor system 204 obtaining accurate vibration data, pressure data, temperature data, location data, and/or the like. Moreover, the energy harvester 212 may be positioned on and/or above the sensor system 204 within the insertion portion 304, which may facilitate transfer of mechanical vibrations produced by the engine 104 to the energy harvester 212 (e.g., because other components of the engine monitoring system 200 are not in the insertion portion 304 to dampen the transfer of the mechanical vibrations). This in turn may facilitate the energy harvester generating electric power to provide to the at least one supercapacitor 210.

As shown in FIGS. 4 and 5, the battery 208 may be positioned on and/or above the energy harvester 212, a PCB 402 that includes the controller 202 (e.g., the controller 202 may be surface mounted to the PCB 402) may be positioned on and/or above the battery 208, and/or the transmitting device 206 may be positioned on and/or above the PCB 402 that includes the controller 202. This configuration, which allows the PCB 402 that includes the controller 202 to reside with a central portion of the oil cap 302, may protect the controller 202 from being damaged (e.g., by excessive vibrations generated by the engine 104, by excessive operating temperatures associated with operation of the engine 104, and/or the like). Moreover, this configuration allows the transmitting device 206 (e.g., an antenna of the transmitting device 206) to transmit information out of the oil cap 302 with little interference by other components of the engine monitoring system 200, which may facilitate the transmitting device 206 establishing and maintaining communication with the monitoring device 214.

As further shown in FIGS. 4 and 5, the at least one supercapacitor 210 (shown in FIG. 4 as two supercapacitors 210) may be positioned on and/or above the PCB 402 that includes the controller 202 and within the turn bar 306. The turn bar 306 may act as a heat sink for the at least one supercapacitor, which may facilitate cooling of the at least one supercapacitor 210 and thereby improve a performance of the at least one supercapacitor 210.

As indicated above, FIGS. 3-5 are provided as examples. Other examples may differ from what is described in connection with FIGS. 3-5.

Figure 6:
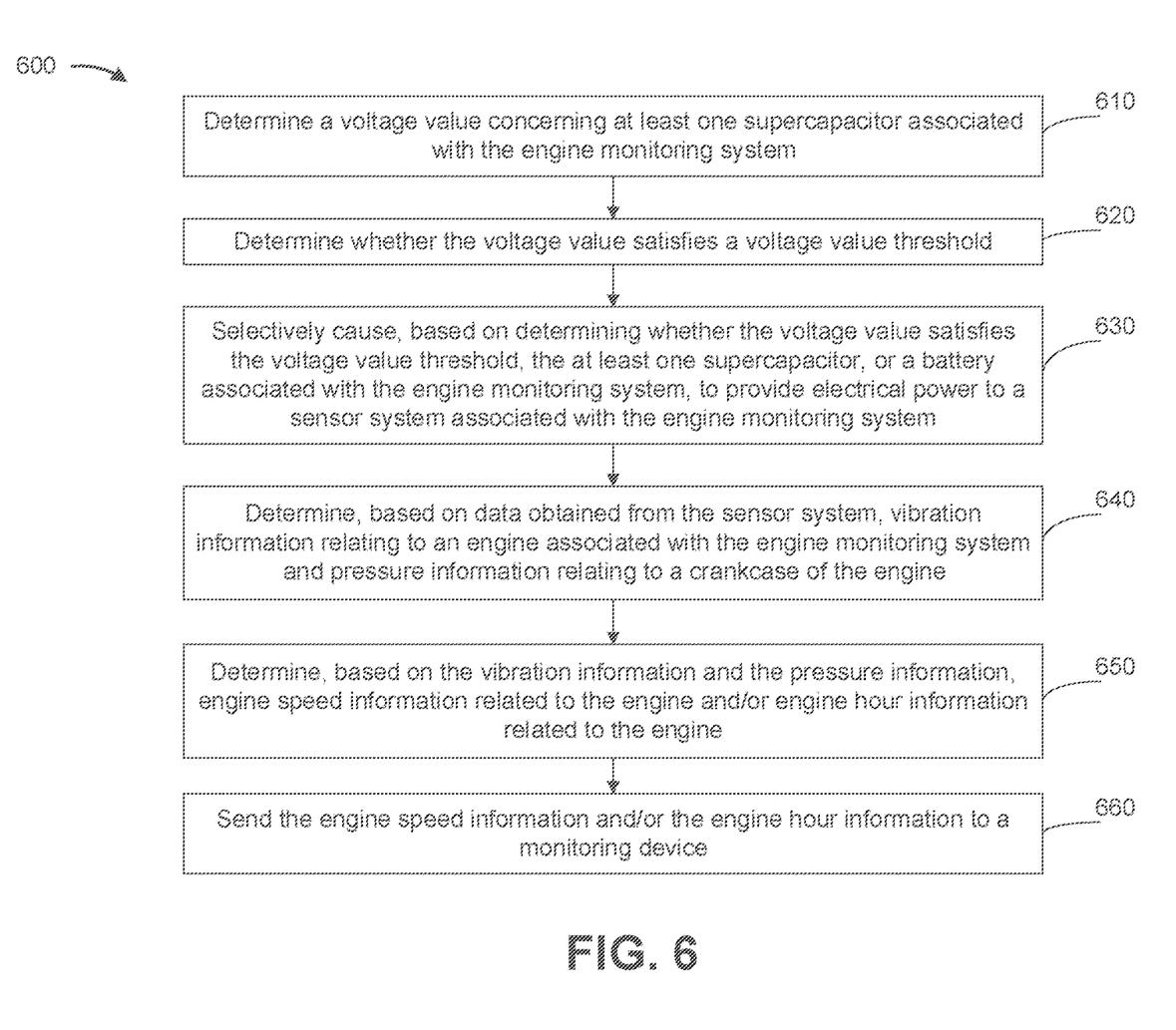
FIGS. 6 and 7 are flowcharts are flow charts of example processes for an engine monitoring system.

FIG. 6 is a flow chart of an example process 600 for an engine monitoring system. In some implementations, one or more process blocks of FIG. 6 may be performed by a controller (e.g., controller 202) of an engine monitoring system (e.g., engine monitoring system 200). In some implementations, one or more process blocks of FIG. 6 may be performed by another device or a group of devices separate from or including the controller, such as a transmitting device (e.g., transmitting device 206), a sensor system (e.g., sensor system 204), and/or the like of the engine monitoring system.

As shown in FIG. 6, process 600 may include determining a voltage value concerning at least one supercapacitor associated with the engine monitoring system (block 610). For example, the controller may determine a voltage value concerning at least one supercapacitor associated with the engine monitoring system, as described above.

As further shown in FIG. 6, process 600 may include determining whether the voltage value satisfies a voltage value threshold (block 620). For example, the controller may determine whether the voltage value satisfies a voltage value threshold, as described above.

As further shown in FIG. 6, process 600 may include selectively causing, based on determining whether the voltage value satisfies the voltage value threshold, the at least one supercapacitor, or a battery associated with the engine monitoring system, to provide electrical power to a sensor system associated with the engine monitoring system (block 630). For example, the controller may selectively cause, based on determining whether the voltage value satisfies the voltage value threshold, the at least one supercapacitor, or a battery associated with the engine monitoring system, to provide electrical power to a sensor system associated with the engine monitoring system, as described above.

As further shown in FIG. 6, process 600 may include determining, based on data obtained from the sensor system, vibration information relating to an engine associated with the engine monitoring system and pressure information relating to a crankcase of the engine (block 640). For example, the controller may determine, based on data obtained from the sensor system, vibration information relating to an engine associated with the engine monitoring system and pressure information relating to a crankcase of the engine, as described above.

As further shown in FIG. 6, process 600 may include determining, based on the vibration information and the pressure information, engine speed information related to the engine and/or engine hour information related to the engine (block 650). For example, the controller may determine, based on the vibration information and the pressure information, engine speed information related to the engine and/or engine hour information related to the engine, as described above. The engine speed information may indicate one or more engine speed ranges of the engine and how long the engine operated within each engine speed range of the one or more engine speed ranges. The engine hour information may indicate a number of hours the engine has operated during a period of time.

As further shown in FIG. 6, process 600 may include sending the engine speed information and/or the engine hour information to a monitoring device (block 660). For example, the controller may send the engine speed information and/or the engine hour information to a monitoring device, as described above.

Process 600 may include additional implementations, such as any single implementation or any combination of implementations described in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
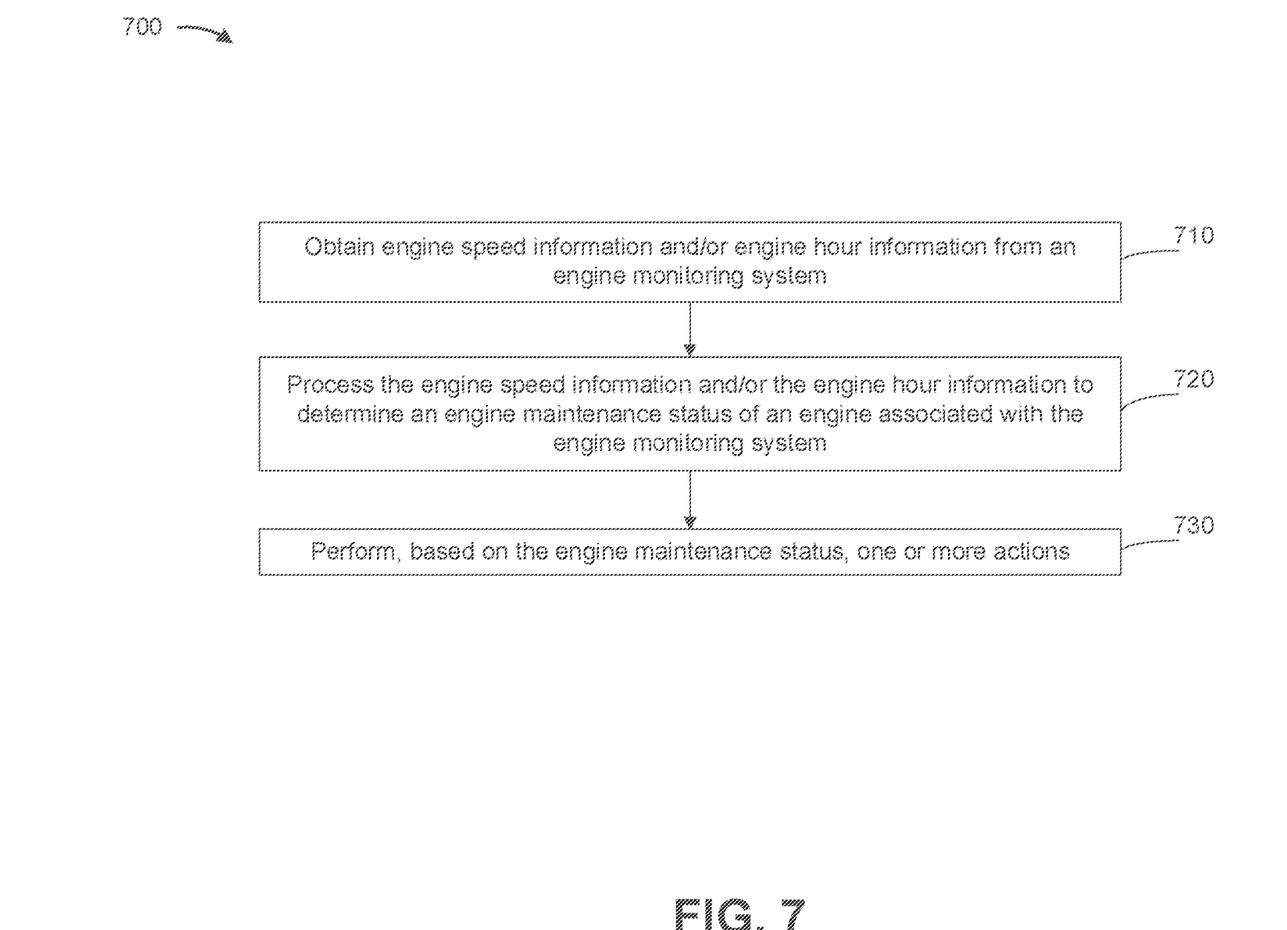

FIG. 7 is a flow chart of an example process 700 for an engine monitoring system. In some implementations, one or more process blocks of FIG. 7 may be performed by a monitoring device (e.g., monitoring device 214). In some implementations, one or more process blocks of FIG. 7 may be performed by another device or a group of devices separate from or including the monitoring device.

As shown in FIG. 7, process 700 may include obtaining engine speed information and/or engine hour information from an engine monitoring system (block 710). For example, the monitoring device may obtain engine speed information and/or engine hour information from an engine monitoring system, as described above.

As further shown in FIG. 7, process 700 may include processing the engine speed information and/or the engine hour information to determine an engine maintenance status of an engine associated with the engine monitoring system (block 720). For example, the monitoring device may process the engine speed information and/or the engine hour information to determine an engine maintenance status of an engine associated with the engine monitoring system, as described above.

As further shown in FIG. 7, process 700 may include performing, based on the engine maintenance status, one or more actions (block 730). For example, the monitoring device may perform, based on the engine maintenance status, one or more actions, as described above. The one or more actions may include storing the engine speed information and/or the engine hour information in a data structure; generating, based on the engine speed information and/or the engine hour information, a maintenance schedule related to maintaining the engine; sending, based on the engine speed information and/or the engine hour information, one or more first instructions concerning maintenance of the engine to a client device to allow the client device to display the one or more first instructions on a display of the client device; and/or sending, based on the engine speed information and/or the engine hour information, one or more second instructions to the client device to allow the client device to dispatch a service technician to service the engine.

Process 700 may include additional implementations, such as any single implementation or any combination of implementations described in connection with one or more other processes described elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

INDUSTRIAL APPLICABILITY

The above-described engine monitoring system utilizes an energy harvester to convert mechanical vibrations associated with operation of the engine into electrical power. The generated electrical power is stored by at least one supercapacitor and then provided to one or more components of the engine monitoring system. Further, the engine monitoring system utilizes a battery to provide electrical power to the one or more components of the engine monitoring system when the at least one supercapacitor does not have enough generated electrical power to provide to the one or more components. In this way, electrical power may be continually provided to the one or more components of the engine monitoring system, even when the at least one supercapacitor needs to be recharged. This may ensure uninterrupted monitoring of the engine. Further, a service life of the battery may be extended by reducing usage of the battery to only those time when the at least one needs to be recharged. This may reduce a frequency and/or amount of time the battery needs to be recharged or replaced, which may reduce an amount of resources needed to maintain and/or service the engine monitoring system.

Further, the engine monitoring system can be included in an oil cap. This ensures that the engine monitoring system is positioned close to the engine, which may facilitate a sensor system of the engine monitoring system obtaining accurate vibration data, pressure data, temperature data, location data, and/or the like. Additionally, being close to the engine facilitates transfer of mechanical vibration produced by the engine to the energy harvester, which may facilitate generation of electric power by the energy harvester. Also, the configuration of the one or more components of the engine monitoring system in the oil cap may serve to protect the one or more components from damage and/or serve to improve a performance of the one or more components.

Moreover, the engine monitoring system utilizes a controller that is able to determine vibration information, pressure information, temperature information, location information, engine hour information and/or engine speed information associated with the engine based on data collected by a sensor system of the engine monitoring system. The engine monitoring system may send the vibration information, the pressure information, the temperature information, the location information, the engine hour information and/or the engine speed information to a monitoring device, which may determine a maintenance status of the engine and perform one or more actions to facilitate maintenance of the engine based on the maintenance status. In this way, the engine monitoring system and/or monitoring device may increase a likelihood of proper, regular maintenance of the engine, which may improve a performance and/or longevity of the engine.

What is claimed is:

1. A method, comprising:
    determining, by a controller associated with an engine monitoring system, a voltage value concerning at least one supercapacitor associated with the engine monitoring system;
    determining, by the controller, whether the voltage value satisfies a voltage value threshold;
    selectively causing, by the controller and based on determining whether the voltage value satisfies the voltage value threshold, the at least one supercapacitor, or a battery associated with the engine monitoring system, to provide electrical power to a sensor system associated with the engine monitoring system;
    determining, by the controller and based on data obtained from the sensor system, vibration information relating to an engine associated with the engine monitoring system and pressure information relating to a crankcase of the engine;
    determining, by the controller and based on the vibration information and the pressure information, engine speed information related to the engine; and
    sending, by the controller, the engine speed information to a monitoring device.

2. The method of claim 1, wherein the engine speed information indicates one or more engine speed ranges of the engine and how long the engine operated within each engine speed range of the one or more engine speed ranges.

3. The method of claim 1, wherein the vibration information indicates a respective number of times the engine vibrates at a frequency within one or more frequency ranges during a period of time,
    wherein determining the engine speed information comprises:
        identifying the one or more frequency ranges indicated by the vibration information;
        determining one or more engine speed ranges respectively associated with the one or more frequency ranges; and
        determining, based on the vibration information, a respective number of times the engine operates at a speed within each engine speed range of the one or more engine speed ranges during the period of time.

4. The method of claim 1, wherein the pressure information indicates a respective number of times gases associated with the crankcase exert a pressure within one or more pressure ranges during a period of time,
    wherein determining the engine speed information comprises:
        determining, based on the pressure information, one or more engine speed ranges respectively associated with the one or more pressure ranges and a respective number of times the engine operates at a speed within each engine speed range of the one or more engine speed ranges during the period of time.

5. The method of claim 1, wherein determining the engine speed information comprises:
    processing the vibration information to determine first engine speed information that indicates one or more engine speed ranges and a respective first number of times the engine operated a speed within each engine speed range, of the one or more engine speed ranges, during a period of time;
    processing the pressure information to determine second engine speed information that indicates a respective second number of times the engine operated at a speed within each engine speed range, of the one or more engine speed ranges, during the period of time; and
    generating, based on combining the first engine speed information and the second engine speed information, the engine speed information.

6. The method of claim 1, wherein sending the engine speed information to the monitoring device comprises:
    sending the engine speed information to the monitoring device according to a schedule.

7. The method of claim 1, wherein sending the engine speed information to the monitoring device comprises:
    causing a transmitting device associated with the engine monitoring system to send, via a cellular connection, the engine speed information to a base station to allow the base station to send the engine speed information to the monitoring device.

8. The method of claim 1, wherein sending the engine speed information to the monitoring device causes the monitoring device to perform one or more actions, the one or more actions including at least one of:
    storing the engine speed information in a data structure;
    generating, based on the engine speed information, a maintenance schedule related to maintaining the engine;
    sending, based on the engine speed information, one or more first instructions concerning maintenance of the engine to a client device to allow the client device to display the one or more first instructions on a display of the client device; or
    sending, based on the engine speed information, one or more second instructions to the client device to allow the client device to dispatch a service technician to service the engine.

9. An engine monitoring system comprising:
    a transmitting device;
    a battery configured to provide electrical power to the transmitting device, a sensor system, and a controller;
    an energy harvester configured to provide electrical power to at least one supercapacitor;
    the at least one supercapacitor configured to provide electrical power to the transmitting device, the sensor system, and the controller;
    a sensor system; and
    a controller configured to:

selectively cause the at least one supercapacitor or the battery to provide electrical power to the transmitting device, the sensor system, and the controller;

determine, based on vibration data obtained from the sensor system, vibration information relating to an engine associated with the engine monitoring system;

determine, based on pressure data obtained from the sensor system, pressure information relating to a crankcase of the engine;

determine, based on the vibration information or the pressure information, engine speed information related to the engine; and send, via the transmitting device, the engine speed information to a monitoring device.

10. The engine monitoring system of claim 9, wherein the controller is further configured to:

determine, based on temperature data and location data obtained from the sensor system, temperature information relating to the engine and location information relating to the engine; and send the temperature information and the location information to the monitoring device.

11. The engine monitoring system of claim 9, wherein the sensor system includes at least one of:

an accelerometer device;

a temperature sensor device;

a pressure sensor device; or a global positioning system (GPS) device.

12. The engine monitoring system of claim 9, wherein the energy harvester is configured to convert mechanical vibrations associated with operation of the engine into electrical power.

13. The engine monitoring system of claim 9, wherein the energy harvester is configured to convert mechanical vibrations that have frequencies in a range of 30 Hz to 100 Hz into electrical power.

14. The engine monitoring system of claim 9, wherein the controller, when sending the engine speed information to the monitoring device, is configured to:

cause the transmitting device to establish a wireless connection with a base station; and cause the transmitting device to send the engine speed information to the monitoring device via the wireless connection.

15. The engine monitoring system of claim 9, wherein the engine monitoring system is included in an oil cap or a coolant cap.

16. The engine monitoring system of claim 15, wherein the at least one supercapacitor is located within a turn bar of the oil cap to facilitate cooling of the at least one supercapacitor.

17. A non-transitory computer-readable medium comprising:

one or more instructions that, when executed by one or more processors associated with an engine monitoring system, cause the one or more processors to:

determine a voltage value concerning at least one supercapacitor associated with the engine monitoring system;

determine whether the voltage value satisfies a voltage value threshold;

selectively cause, based on determining whether the voltage value satisfies the voltage value threshold, the at least one supercapacitor, or a battery associated with the engine monitoring system, to provide electrical power to a sensor system associated with the engine monitoring system;

determine, based on data obtained from the sensor system, vibration information relating to an engine associated with the engine monitoring system and pressure information relating to a crankcase of the engine;

determine, based on the vibration information and the pressure information, engine speed information related to the engine; and send the engine speed information to a monitoring device.

18. The non-transitory computer-readable medium of claim 17, wherein the engine speed information indicates one or more engine speed ranges of the engine and how long the engine operated within each engine speed range of the one or more engine speed ranges.

19. The non-transitory computer-readable medium of claim 17, wherein the vibration information indicates a respective number of times the engine vibrates at a frequency within one or more frequency ranges during a period of time.

20. The non-transitory computer-readable medium of claim 17, wherein the pressure information indicates a respective number of times gases associated with the crankcase exert a pressure within one or more pressure ranges during a period of time.

* * * * *